US009818305B2

(12) United States Patent
Conway

(10) Patent No.: US 9,818,305 B2
(45) Date of Patent: Nov. 14, 2017

(54) METHOD AND APPARATUS FOR MONITORING COMPLIANCE WITH A NON-TRANSGRESSION ZONE BETWEEN AIRCRAFT APPROACH CORRIDORS

(71) Applicant: The Boeing Company, Chicago, IL (US)

(72) Inventor: Sheila R. Conway, Seattle, WA (US)

(73) Assignee: The Boeing Company, Chicago, IL (US)

(*) Notice: Subject to any disclaimer, the term of this patent is extended or adjusted under 35 U.S.C. 154(b) by 24 days.

(21) Appl. No.: 14/858,675

(22) Filed: Sep. 18, 2015

(65) Prior Publication Data

US 2017/0084182 A1 Mar. 23, 2017

(51) Int. Cl.

*G06F 19/00* (2011.01)
*G08G 5/02* (2006.01)
*G08G 5/00* (2006.01)

(52) U.S. Cl.

CPC ............. *G08G 5/02* (2013.01); *G08G 5/0013* (2013.01); *G08G 5/0026* (2013.01); *G08G 5/0043* (2013.01); *G08G 5/0082* (2013.01); *G08G 5/025* (2013.01)

(58) Field of Classification Search

CPC ....... G08G 5/02; G08G 5/0043; G08G 5/0082
USPC ....................................................... 701/1, 120
See application file for complete search history.

(56) References Cited

U.S. PATENT DOCUMENTS

| | | | | | |
|---|---|---|---|---|---|
| 3,414,899 | A * | 12/1968 | Buell | G01C 21/165 | 33/323 |
| 4,706,199 | A * | 11/1987 | Guerin | G01C 21/22 | 342/181 |
| 5,574,648 | A * | 11/1996 | Pilley | G01C 23/00 | 340/945 |
| 6,195,609 | B1 * | 2/2001 | Pilley | G01C 23/00 | 342/36 |
| 6,262,679 | B1 * | 7/2001 | Tran | G01S 13/9303 | 342/29 |
| 6,292,721 | B1 * | 9/2001 | Conner | G01C 5/005 | 340/970 |

(Continued)

OTHER PUBLICATIONS

Manual on Simultaneous Operations on Parallel or Near-Parallel Instrument Runaways (SOIR), Doc 9643, First Edition, International Civil Aviation Organization (2004) 38 pages.

(Continued)

*Primary Examiner* — Ronnie Mancho
(74) *Attorney, Agent, or Firm* — Alston & Bird LLP

(57) ABSTRACT

A method, computing system and computer program product are provided to monitor compliance with a non-transgression zone between aircraft approach corridors, thereby facilitating simultaneous instrument approaches. In the context of a method, a predicted path of an aircraft is determined during a flight based upon at least a representation of a roll angle of the aircraft and a cross-track component of the velocity of the aircraft. The method also includes identifying an instance in which the predicted path of the aircraft during the flight intersects a non-transgression zone. The method further includes causing an alert to be issued in the instance in which the predicted path of the aircraft during the flight intersects the non-transgression zone.

20 Claims, 7 Drawing Sheets

(56) References Cited

U.S. PATENT DOCUMENTS

| | | | | |
|---|---|---|---|---|
| 6,477,326 | B1 * | 11/2002 | Partynski | G01C 11/025 348/146 |
| 6,658,207 | B1 * | 12/2003 | Partynski | G01C 11/025 348/144 |
| 8,731,810 | B2 | 5/2014 | Conway | |
| 8,868,328 | B1 * | 10/2014 | Estkowski | G08G 5/045 701/301 |
| 2002/0089432 | A1 | 7/2002 | Staggs et al. | |
| 2003/0004641 | A1 | 1/2003 | Corwin et al. | |
| 2003/0016145 | A1 * | 1/2003 | Bateman | B64D 43/02 340/967 |
| 2003/0107499 | A1 * | 6/2003 | Lepere | G01C 5/005 340/945 |
| 2004/0046687 | A1 | 3/2004 | LaFrey et al. | |
| 2006/0244637 | A1 * | 11/2006 | Baranov | G01S 13/9303 340/968 |
| 2007/0032940 | A1 * | 2/2007 | Villiers | G08G 5/0013 701/120 |
| 2007/0103340 | A1 * | 5/2007 | Baranov | G01C 23/00 340/968 |
| 2007/0299611 | A1 * | 12/2007 | Winkler | G01C 23/005 701/301 |
| 2008/0039984 | A1 * | 2/2008 | Bitar | G01C 21/20 701/3 |
| 2012/0150426 | A1 | 6/2012 | Conway | |

OTHER PUBLICATIONS

FAA 7110.65 Controller Handbook, U.S. Department of Transportation, Federal Aviation Administration, Dec. 10, 2015, 54 pages.

European Search Report for Application No. EP 16 18 8917 dated Feb. 17, 2017.

* cited by examiner

METHOD AND APPARATUS FOR MONITORING COMPLIANCE WITH A NON-TRANSGRESSION ZONE BETWEEN AIRCRAFT APPROACH CORRIDORS

TECHNOLOGICAL FIELD

An example embodiment of the present disclosure relates generally to the monitoring of compliance with a non-transgression zone between aircraft approach corridors and, more particularly, to the monitoring of compliance with a non-transgression zone between aircraft approach corridors during flight of an aircraft by utilizing at least a representation of a roll angle of the aircraft and a cross-track component of the velocity of the aircraft.

BACKGROUND

In some instances, aircraft are authorized to execute instrument approaches and to land while being relatively close together. In this regard, some busy airport terminals permit modes of aircraft operation in which instrument approaches are executed for aircraft that are concurrently landing on substantially parallel runways, with the aircraft being permitted to be at the same altitude and to have less than one mile lateral separation therebetween. These instrument approaches and landings may be conducted under various conditions including in poor visibility conditions and with low cloud ceilings, such as in instrument meteorological conditions (IMC).

In instances in which aircraft that are landing on substantially parallel runways are executing simultaneous instrument approaches, separation is maintained between the aircraft in a procedural manner. In this regard, prior to the loss of standard radar separation between the aircraft, the aircraft are established on guidance to instrument approach procedures that have been designed so that the aircraft will not interfere with one another and that are deemed suitable for simultaneous use. In this regard, once the aircraft are established along their instrument approaches, the separation between the aircraft that is otherwise maintained, such as a vertical separation of one thousand feet and a lateral separation of three nautical miles, is discontinued. However, if either aircraft that is contemporaneously executing the approaches to parallel or near-parallel runways deviates from the lateral path defined by its assigned instrument approach, separation may no longer be assured procedurally and intervention by an air traffic controller may be indicated.

The International Civil Aviation Organization (ICAO) defines the standards for air traffic control authorities worldwide. ICAO requires air traffic controllers to identify such deviations of an aircraft from the lateral path defined by its assigned instrument approach during simultaneous independent operation in a timely manner to insure the continued safety of the air traffic. In this regard, air traffic controllers have the responsibility to recognize the penetration by an aircraft of a neutral zone that is considered to exist between substantially parallel runways. This neutral zone is defined as a non-transgression zone (NTZ) and the recognition by an air traffic controller of its penetration may permit the air traffic controller to take action to minimize the safety impact of any deviation by the aircraft. The NTZ is nominally defined as a region that extends laterally one thousand feet on either side of the median between parallel runways, although the NTZ may be defined differently based on the airport geometry.

In order to alert an air traffic controller of the penetration of the NTZ by an aircraft, a final monitor aid (FMA) system causes the NTZ to be depicted on the display of the air traffic controller radar system. The FMA also utilizes historical position data of an aircraft established by the prior locations of the aircraft along its flight path to identify an instance in which the aircraft is predicted to penetrate the NTZ and to correspondingly alert the air traffic controller. In domestic systems, for example, the FMA has three different alerting triggers. The FMA provides a caution alert in an instance in which the system predicts that an aircraft will enter the NTZ within ten seconds. In response to a caution alert, the radar target symbol and data block may change colors, such as from green to yellow, and an audible alert may be sounded. The FMA may also issue a warning alert in an instance in which the aircraft has penetrated the NTZ. In this instance, the target symbol and the data block may change to yet a different color, such as red. The FMA may also issue a surveillance alert in an instance in which a monitored aircraft has been in a coast state for more than three consecutive updates. In this instance, the target symbol and data block may also be caused to change colors, such as to amber.

The FMA alerting system assists air traffic controllers by providing notification of the penetration of the NTZ based on radar or other surveilled position data. Once notified, an air traffic controller may develop and issue instructions to the aircraft and the pilots of the aircraft should respond to those instructions so as to maintain the desired separation between the aircraft. The instructions issued by an air traffic controller may include instructions to an aircraft that is potentially endangered by another aircraft that has deviated into the NTZ so as to cause the other aircraft to alter its flight path to ensure its safety as well as instructions to the aircraft that has deviated in the NTZ to cause the deviating aircraft to return to its proper approach corridor.

BRIEF SUMMARY

A method, computing system and computer program product are provided in accordance with an example embodiment of the present disclosure in order to monitor compliance with a non-transgression zone between aircraft approach corridors. Thus, the method, computing system and computer program product may facilitate simultaneous instrument approaches. For instance, the method, computing system and computer program product of an example embodiment may monitor compliance with a non-transgression zone and may issue any alerts in a timely fashion, thereby not only providing additional time for air traffic controllers to respond to the alerts in order to insure the safety of the aircraft, but also allowing for compliance with a non-transgression zones defined along curved aircraft approach corridors to be monitored. Further, the method, computing system and computer program product of an example embodiment, determine the predicted path of an aircraft based at least in part upon a representation of a roll angle of the aircraft and a cross-track component of the velocity of the aircraft such that an instance in which the predicted path of the aircraft intersects a non-transgression zone may be identified with increased accuracy, thereby reducing the percentage of nuisance alerts.

In an example embodiment, a method for monitoring compliance with a non-transgression zone between aircraft approach corridors is provided that includes determining, with processing circuitry, a predicted path of an aircraft during a flight based upon at least a representation of a roll angle of the aircraft and a cross-track component of the velocity of the aircraft. In some embodiments, the predicted path of the aircraft is also determined based upon a current position and heading of the aircraft. The method of an example embodiment also includes identifying an instance in which the predicted path of the aircraft during the flight intersects a non-transgression zone. The method of this example embodiment also includes causing an alert to be issued in the instance in which the predicted path of the aircraft during the flight intersects the non-transgression zone.

The method of an example embodiment determines the predicted path of the aircraft by determining the representation of the roll angle in real time. As such, the method of this example embodiment also causes the alert to be issued in real time. The method of an example embodiment determines the predicted path by determining a turn rate and a turn radius based upon at least the representation of the roll angle of the aircraft and the cross-track component of the velocity of the aircraft. The method of an example embodiment also includes receiving the representation of the roll angle of the aircraft and the cross-track component of velocity of the aircraft from at least one of an enhanced surveillance (EHS) surveillance transponder or from an automatic dependent surveillance broadcast (ADS-B) message. The method of an example embodiment identifies an instance in which the predicted path of the aircraft intersects the non-transgression zone by determining, prior to the aircraft reaching its largest cross-track position error, that a corrective action has been initiated by the aircraft to avoid intersection with the non-transgression zone. The processing circuitry which determines the predicted path of the aircraft may be embodied by an air traffic control ground station, by an air traffic control radar system or as an auxiliary function to a display of the air traffic control radar system.

In another example embodiment, a computing system is provided for monitoring compliance with a non-transgression zone between aircraft approach corridors. The computing system includes processing circuitry configured to determine a predicted path of the aircraft during a flight based upon at least a representation of a roll angle of the aircraft and a cross-track component of the velocity of the aircraft. The processing circuitry of an example embodiment is also configured to determine the predicted path based upon a current position and heading of the aircraft. The processing circuitry of an example embodiment is also configured to identify an instance in which the predicted path of the aircraft during the flight intersects a non-transgression zone. The processing circuitry of an example embodiment is further configured to cause an alert to be issued in the instance in which the predicted path of the aircraft during the flight intersects the non-transgression zone.

The processing circuitry of an example embodiment is configured to determine the predicted path of the aircraft by determining the representation of the roll angle of the aircraft in real time. The processing circuitry of this example embodiment is also configured to cause the alert to be issued in real time. The processing circuitry of an example embodiment is configured to determine the predicted path by determining a turn rate and a turn radius based upon at least the representation of the roll angle of the aircraft and the cross-track component of the velocity of the aircraft. The processing circuitry of an example embodiment is further configured to receive the representation of the roll angle of the aircraft and the cross-track component of the velocity of the aircraft from at least one of an enhanced surveillance (EHS) surveillance transponder or from an automatic dependent surveillance broadcast (ADS-B) message. The processing circuitry of an example embodiment is configured to identify an instance in which the predicted path of the aircraft intersects the non-transgression zone by determining, prior to the aircraft reaching its largest cross-track position error, whether corrective action has been initiated by the aircraft to avoid intersection with the non-transgression zone. The processing circuitry of an example embodiment is embodied by an air traffic control ground station, by an air traffic control radar system or as an auxiliary function to a display of the air traffic control radar system.

In a further example embodiment, a computer program product is provided for monitoring compliance with a non-transgression zone between aircraft approach corridors. The computer program product includes at least one non-transitory computer-readable storage medium having computer-executable program code instructions stored therein. The computer-executable program code instructions include program code instructions configured to determine a predicted path of the aircraft during a flight based upon at least a representation of a roll angle of the aircraft and a cross-track component of the velocity of the aircraft. In an example embodiment, the program code instructions configured to determine the predicted path are further based upon a current position and heading of the aircraft. The computer-executable program code instructions of an example embodiment also include program code instructions configured to identify an instance in which the predicted path of the aircraft during the flight intersects the non-transgression zone. The computer-executable program code instructions of this example embodiment further include program code instructions configured to cause an alert to be issued in the instance in which the predicted path of the aircraft during the flight intersects the non-transgression zone.

The program code instructions configured to determine the predicted path of the aircraft include, in an example embodiment, program code instructions configured to determine the representation of the roll angle of the aircraft in real time. In this example embodiment, the program code instructions are also configured to cause an alert to be issued in real time. The program code instructions that are configured to determine the predicted path include, in an example embodiment, program code instructions configured to determine a turn rate and a turn radius based upon at least the representation of the roll angle of the aircraft and the cross-track component of the velocity of the aircraft. The computer-executable program code instructions of an example embodiment further include program code instructions configured to receive the representation of the roll angle of the aircraft and the cross-track component of the velocity of the aircraft from at least one of an enhanced surveillance (EHS) surveillance transponder or from an automatic dependent surveillance broadcast (ADS-B) message. In an example embodiment, the program code instructions configured to identify an instance in which the predicted path of the aircraft intersects the non-transgression zone include program code instructions configured to determine, prior to the aircraft reaching its largest cross-track position error, whether corrective action has been initiated by the aircraft to avoid intersection with the non-transgression zone.

BRIEF DESCRIPTION OF THE DRAWINGS

Figure 1:
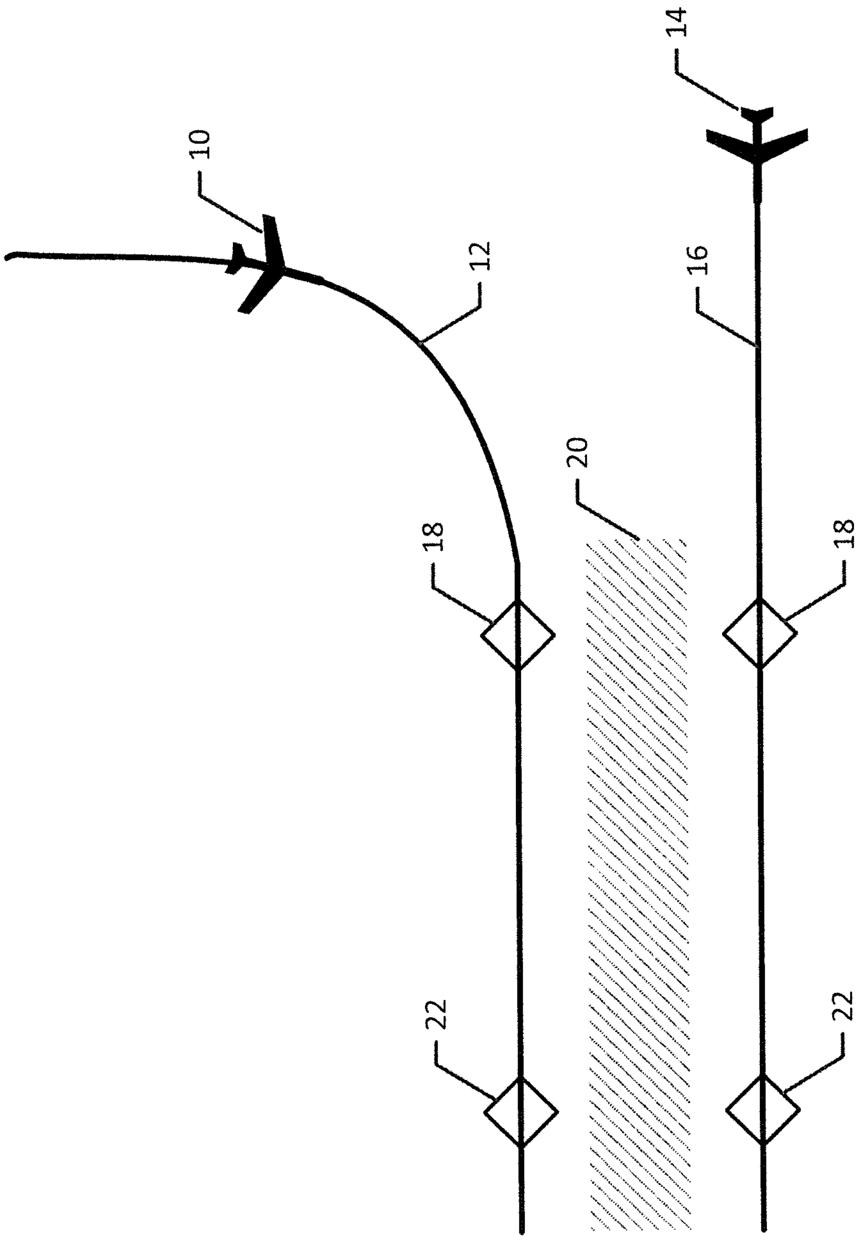
Figure 2:
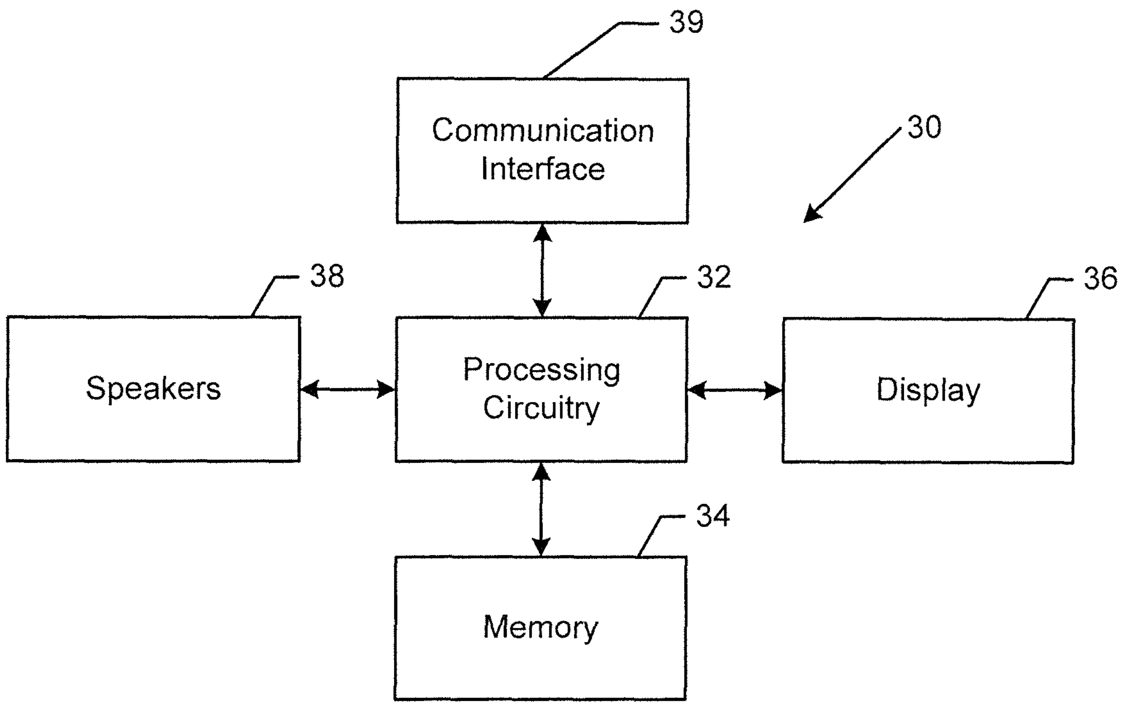
Figure 3:
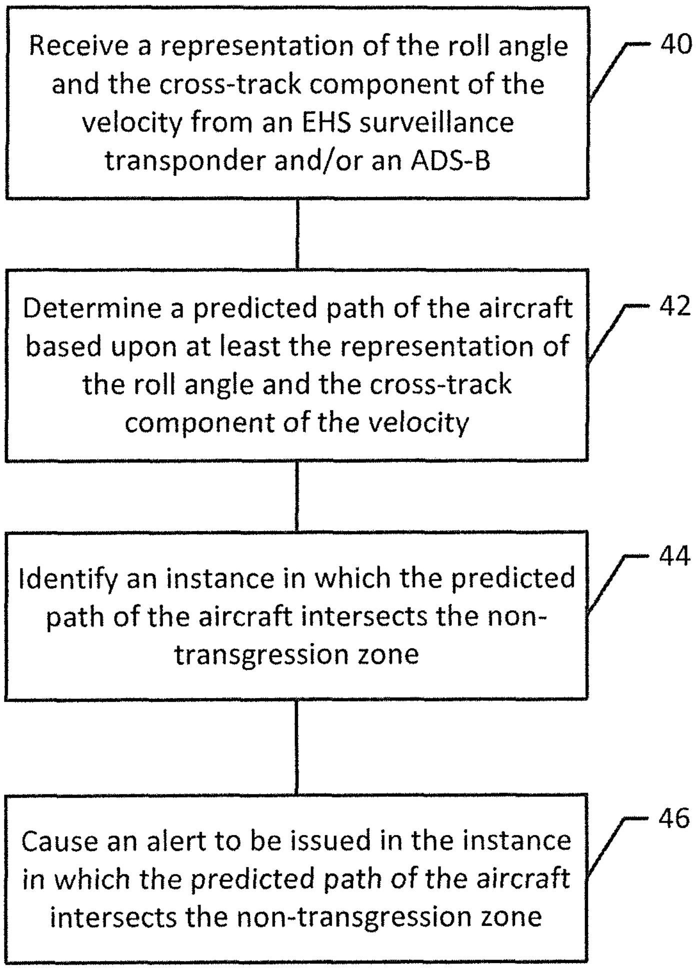
Figure 4:
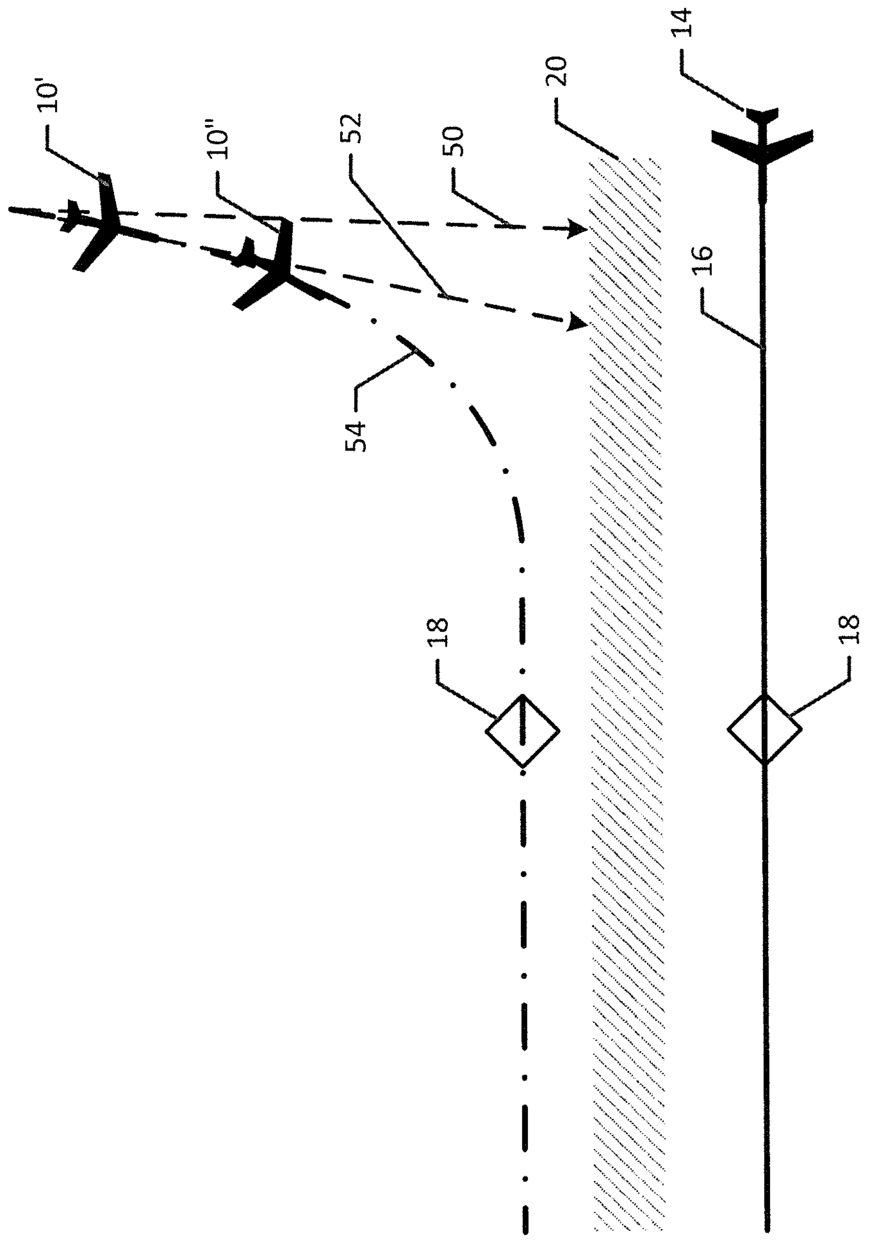
Figure 5:
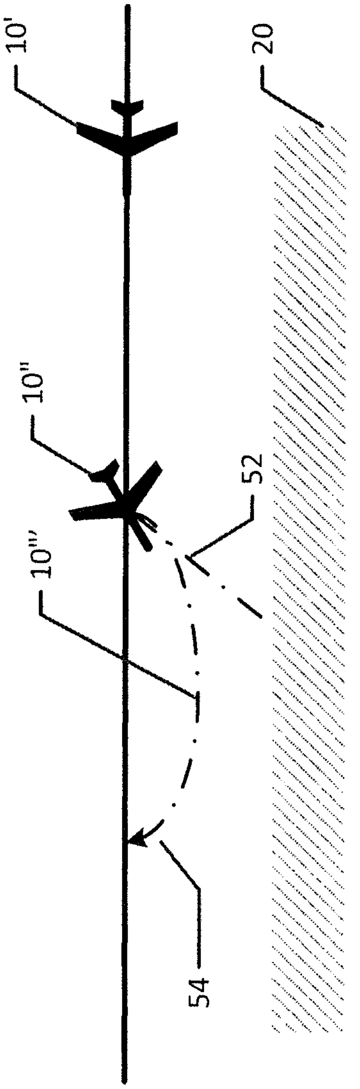
Figure 6:
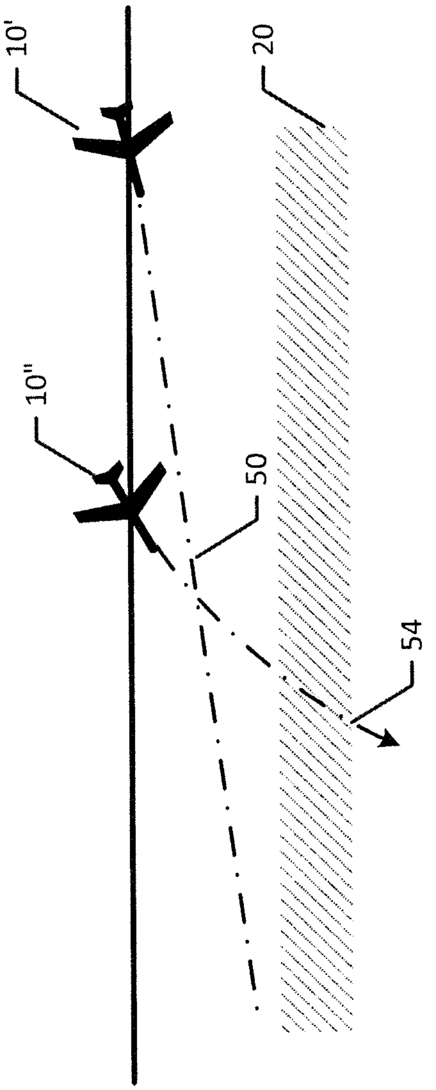
Figure 7:
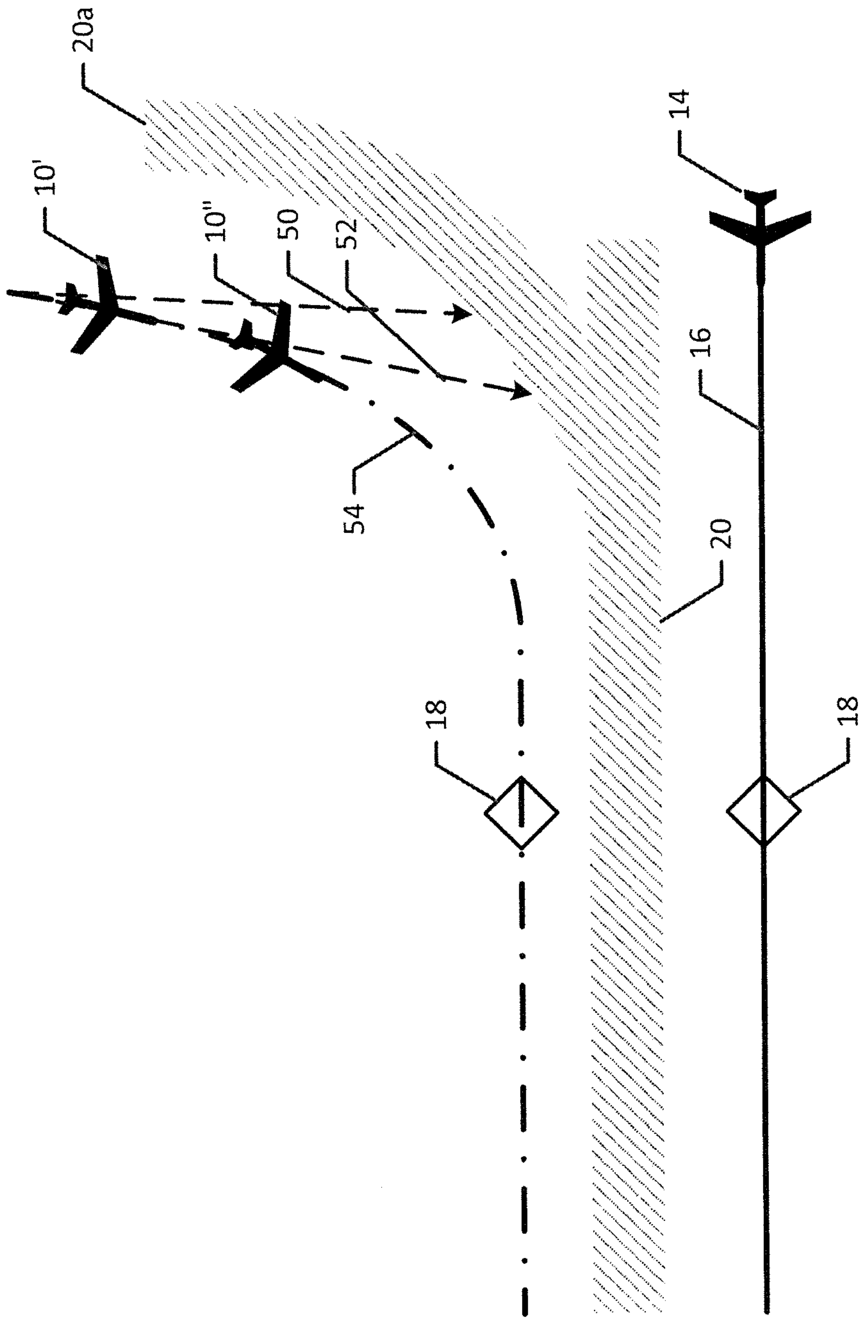

Having thus described certain example embodiments of the present disclosure in general terms, reference will here-inafter be made to the accompanying drawings, which are not necessarily drawn to scale, and wherein:

FIG. 1 represents the aircraft approach corridors of two aircraft utilizing instrument approaches to land along substantially parallel runways with a non-transgression zone defined therebetween;

FIG. 2 is a block diagram illustrating a computing system that may be specifically configured in accordance with an example embodiment of the present disclosure;

FIG. 3 is a flowchart illustrating operations performed, such as by the computing system of FIG. 2, in accordance with an example embodiment of the present disclosure;

FIG. 4 is a representation of aircraft along simultaneous instrument approaches which depicts the predicted path of the aircraft based upon a representation of the roll angle of the aircraft and a cross-track component of the velocity of the aircraft in accordance with an example embodiment of the present disclosure;

FIG. 5 illustrates the determination that corrective action has been initiated by an aircraft to avoid intersection with the non-transgression zone so as to avoid issuance of a nuisance alert in accordance with an example embodiment of the present disclosure;

FIG. 6 illustrates an instance in which a predicted path of the aircraft is identified to intersect the non-transgression zone so as to cause an alert to be issued in accordance with an example embodiment of the present disclosure; and FIG. 7 illustrates a non-transgression zone that may be utilized in conjunction with a curved approach and for which compliance may be monitored in accordance with an example embodiment of the present disclosure.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

During simultaneous instrument approaches by two or more aircraft that are landing along respective parallel or near-parallel runways, a non-transgression zone (NTZ) may be defined between the runways. Alerts may be issued if the aircraft penetrates or if the path of the aircraft indicates that the aircraft will penetrate the NTZ. In response to the alert, an air traffic controller may take appropriate action in order to ensure the safety of the aircraft. With respect to the example of FIG. 1, a first aircraft 10 is executing an instrument approach along flight path 12, while a second aircraft 14 is executing an instrument approach along flight path 16. These instrument approaches conclude with the aircraft landing along parallel or near-parallel runways. Prior to reaching waypoints 18, the aircraft may be required to maintain standard radar separation including the maintenance of a vertical separation of at least one thousand feet. However, once the aircraft reach waypoints 18, the standard radar separation, including a vertical separation of one thousand feet, need no longer be maintained and, instead, an NTZ 20 is defined between the aircraft approach corridors for the first and second aircraft. By way of example, prior to the first waypoint 18, the first aircraft 10 may descend to an altitude of 3,500 feet while the second aircraft 14 maintains an altitude of 2,500 feet. Once the aircraft pass the waypoint 18, the first aircraft 10 may further descend to 2,500 feet such that by waypoint 22, both aircraft may be at the same altitude. By monitoring compliance with the NTZ in accordance with an example embodiment as described below, the first and second aircraft may land on the parallel or near-parallel runways utilizing instrument approaches even though standard radar separation is no longer maintained once the aircraft are within approach corridors alongside the NTZ.

In an example embodiment, a computing system 30 is provided for monitoring compliance with an NTZ 20 between aircraft approach corridors. An example embodiment of the computing system 30 is depicted in FIG. 2, although the computing system may be embodied in a variety of different manners. A computing system may be embodied by an air traffic control ground station or by an air traffic control radar system. Alternatively, the computing system may be embodied as an auxiliary function to the display of an air traffic control radar system.

Regardless of the manner in which the computing system 30 is embodied, the computing system of an example embodiment or is otherwise associated with a processing circuitry 32, memory 34, a user interface (such as exemplified by a display 36 and speakers 38) and a communication interface 39 for performing the various functions herein described. The processing circuitry 32 may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. In some example embodiments, the processing circuitry 32 is configured to execute instructions stored in the memory 34 or otherwise accessible to the processing circuitry. These instructions, when executed by the processing circuitry 32, may cause the computing system 30 to perform one or more of the functionalities described herein. As such, the computing system 30 may comprise an entity capable of performing operations according to embodiments of the present disclosure while configured accordingly. Thus, for example, when the processing circuitry 32 is embodied as an ASIC, FPGA or the like, the processing circuitry and, correspondingly, the computing system 30 may comprise specifically configured hardware for conducting one or more operations described herein. Alternatively, as another example, when the processing circuitry 32 is embodied as an executor of instructions, such as may be stored in the memory 34, the instructions may specifically configure the processing circuitry and, in turn, the computing system 30 to perform one or more algorithms and operations described herein.

The memory 34 may include, for example, volatile and/or non-volatile memory. The memory 34 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 34 may comprise any non-transitory computer readable storage medium. The memory 34 may be configured to store information, data, applications, instructions, or the like for enabling the computing system 30 to carry out various functions in accordance with example embodiments of the present disclosure. For example, the memory 34 may be configured to store program instructions for execution by the processing circuitry 32.

The user interface may be in communication with the processing circuitry 32 and the memory 34 to receive an indication of a user input and/or to provide an audible, visual, mechanical, or other output to a user. As such, the user interface may include, for example, a display 36 and one or more speakers 36 for providing visual and audible output to a user as described below. Other examples of the user interface include a keyboard, a mouse, a joystick, a microphone and/or other input/output mechanisms.

The communication interface 39 may be in communication with the processing circuitry 32 and the memory 34 and may be configured to receive and/or transmit data, such as described below. The communication interface 39 may include, for example, one or more antennas and supporting hardware and/or software for enabling communications with a wireless communication network. Additionally or alternatively, the communication interface 39 may include the circuitry for interacting with the antenna(s) to cause transmission of signals via the antenna(s) or to handle receipt of signals received via the antenna(s). In some environments, the communication interface 39 may alternatively or also support wired communication.

Regardless of the manner in which the computing system 30 is configured, the computing system, such as the processing circuitry 32, may be configured to monitor compliance with an NTZ within aircraft approach corridors, such as those defined between substantially parallel runways. As shown in block 40 of FIG. 3, for example, the computing system 30, such as the processing circuitry 32, the communication interface 39 or the like, is configured to receive a representation of the roll angle and the cross-track component of the velocity of the aircraft. The representation of the roll angle and the cross-track component of the velocity of the aircraft may be received, for example, from an enhanced surveillance (EHS) surveillance transponder and/or an automatic dependent surveillance broadcast (ADS-B) message. With respect to the representation of the roll angle, the roll angle may be defined in various manners including the current roll angle of the aircraft, such as defined by the current state vector, the current rate of change of the roll angle, that is, the roll rate, or another representation of the roll rate of the aircraft. In addition, the cross-track component of the velocity of the aircraft is the component of velocity that is perpendicular to the assigned track of the aircraft. The computing system 30, such as the processing circuitry 32, the communication interface 39 or the like, may also be configured to receive additional parameters including, for example, the current position and heading of the aircraft and/or the turn rate and radius of the aircraft. By receiving the various aircraft parameters including a representation of the roll angle and the cross-track component of the velocity of the aircraft, such as from an EHS surveillance transponder and/or from ADS-B message, the parameters may be received on a timely basis such that the computing system 30 may perform its analysis and issue any alerts in a correspondingly timely fashion, thereby providing air traffic controllers with additional time in order to issue appropriate instructions to the aircraft so as to insure the safety of the aircraft, relative to reliance upon the radar/surveillance frequency available in the terminal air space which may impose a delay, such as a delay of 4 to 5 seconds in some instances, and which may correspondingly either delay the issuance of alerts to the air traffic controllers and/or reduce the time that the air traffic controllers are provided to issue instructions to the aircraft in order to ensure the safety of the aircraft.

The computing system 30, such as the processing circuitry 32, is also configured to determine the predicted path of the aircraft based upon at least the representation of the roll angle and the cross-track component of the velocity of the aircraft. See block 42 of FIG. 3. As described above, the computing system 30, such as the processing circuitry 32, may also be configured to take into account one or more additional aircraft parameters, such as the current position and heading of the aircraft, in the determination of the predicted path of the aircraft. By relying upon current aircraft parameters, such as a representation of the roll angle of the aircraft, such as the roll angle or the roll rate, and the cross-track component of the velocity of the aircraft, and, in some instances, by also relying upon the current position and current heading of the aircraft, such as provided by the EHS surveillance transponder and/or the ADS-B message, the path of the aircraft may be predicted with greater accuracy relative to techniques that rely upon the past track of the aircraft including the aircraft location at prior instances of time. Additionally, the aircraft parameters may be used to predict future aircraft state, which may correspondingly either improve the issuance of alerts to the air traffic controllers and/or increase the time that the air traffic controllers are provided to issue instructions to the aircraft in order to ensure the safety of the aircraft. Consequently, both the nature of the data as well as the timeliness of the data provided by the EHS surveillance transponder and/or the ADS-B message allows for the computing system 30 to provide a superior alert.

As shown in FIG. 4, the predicted path 54 of the aircraft that was previously located at 10' and is now located at 10" may be determined based upon the current aircraft parameters at 10" including a representation of the roll angle of the aircraft and the cross-track component of the velocity of the aircraft and, in some embodiments, the current position of the aircraft and the current heading of the aircraft. In this example, the path 54 predicted based upon the current aircraft parameters at 10" including a representation of the roll angle of the aircraft and the cross-track component of the velocity of the aircraft follows a curved path through waypoint 18 and along the aircraft approach corridor without intersection of the NTZ 20. In contrast, the path 50 of the aircraft that may be predicted based upon historical position information of the aircraft, such as the prior location 10', as may be provided by the radar system available within the terminal airspace may interest the NTZ 20. Similarly, a path 52 predicted based upon the current position and current heading of the aircraft without consideration of the representation of the roll angle and the cross-track component of the velocity of the aircraft may also intersect the NTZ 20. Thus, the predicted path 54 of the aircraft that is determined in accordance with an example embodiment of the present disclosure and that takes into account the representation of the roll angle and the cross-track component of the velocity of the aircraft may more accurately predict the actual path of the aircraft and reduce the issuance of nuisance alerts to an air traffic controller, such as may be issued in instances in which the aircraft path is incorrectly predicted to intersect the NTZ 20 in accordance with other techniques, such as based upon the historical location of the aircraft or based upon the current position and current heading of the aircraft.

The computing system 30, such as the processing circuitry 32, is also configured to identify an instance in which the predicted path of the aircraft intersects the NTZ 20. See block 44 of FIG. 3. In order to provide alerts in a more timely manner and to provide an air traffic controller with additional time in order to issue instructions so as to maintain the safety of the aircraft, the computing system 30, such as the processing circuitry 32, of an example embodiment of the present disclosure is configured to determine, prior to aircraft reaching its largest cross-track position error, whether corrective action has been initiated by the aircraft to avoid intersection with the NTZ 20. The computing system 30, such as the processing circuitry 32, may be configured to determine whether corrective action has been taken in various manners including by determining, based upon the representation of the roll angle of the aircraft and/or the cross-track component of the velocity of the aircraft, whether the pilot of the aircraft has initiated corrective action that would avoid intersection with the NTZ 20.

As shown in FIG. 5, for example, an aircraft within an approach corridor at location 10" may have a current position and a current heading that indicates that the plane may intersect the NTZ 20, as shown by the predicted path 52. However, the computing system 30, such as the processing circuitry 32, of this example embodiment is configured to determine, such as based upon the representation of the roll angle of the aircraft and/or the cross-track component of the velocity of the aircraft, that corrective action has been taken by the pilot such that the predicted path 50 of the aircraft will not, in fact, intersect the NTZ 30. As such, the computing system 30 need not issue an alert, thereby avoidance of a nuisance alert. As shown in FIG. 5, however, the determination that corrective action has been initiated by the aircraft may be determined by the computing system 30, such as the processing circuitry 32, while the aircraft is at location 10" based upon, for example, the representation of the roll angle of the aircraft and/or the cross-track component of the velocity of the aircraft, prior to the aircraft reaching the largest cross-track position error as shown at location 10'".

The representation of the roll angle of the aircraft and the cross-track component of the velocity of the aircraft will not always cause the predicted path of the aircraft to be determined in a manner that avoids intersection with the NTZ 20, but will, instead, predict the intersection with the NTZ in a more timely and accurate manner. As shown in FIG. 6, for example, the computing system 30, such as the processing circuitry 32, is configured to identify that the predicted path of the aircraft based upon, for example, the representation of the roll angle of the aircraft and the cross-track component of the velocity of the aircraft, will intersect the NTZ 20. By determining the predicted path of the aircraft based upon the representation of the roll angle of the aircraft and the cross-track component of the velocity of the aircraft, the instance in which the predicted path of the aircraft will intersect the NTZ 20 may be determined substantially in advance of the penetration by the aircraft to the NTZ. Thus, the air traffic controller may be alerted in a more timely fashion and may have additional time in which to provide instructions to the aircraft to ensure their continued safety.

As shown in block 46 of FIG. 3, the computing system 30, such as the processing circuitry 32, the display 36, the speakers 38 or the like, is also configured to cause an alert to be issued in the instance in which the predicted path of the aircraft intersects the NTZ 20. Various types of alerts may be caused to be issued including visual alerts via the display 36, such as the display of an air traffic control radar system. In this regard, the alert may include a change in color of various features presented upon the display including the depiction of the aircraft, the NTZ 20, the predicted path of the aircraft or the like. In addition or alternatively, audible alerts may be issued, such as via the speakers 38. In addition, a record or report of the issuance of the alert and the circumstances that led to the issuance of the alert including the predicted path 54 of the aircraft and the various parameters of the aircraft including the representation of the roll angle of the aircraft and the cross-track component of the velocity of the aircraft may be recorded, such as in memory 34.

In response to the alert, an air traffic controller may review the situation and issue instructions. These instructions may include instructions to the aircraft that is executing a simultaneous instrument approach along a parallel or near-parallel runway to alter their flight path in order to more clearly avoid the aircraft having a predicted path 54 that intersects the NTZ 20. Additionally or alternatively, the instructions may include instructions to the aircraft that has deviated from the approach corridor and that has a predicted path that intersects the NTZ 20 so as to redirect the aircraft back towards its approach corridor. In an example embodiment, the computing system 30, such as the processing circuitry 32, is configured to determine the predicted path of the aircraft in real time and to cause the alert to be issued in real time. By basing the determination of the predicted path upon current parameters of the aircraft, such as provided by an EHS surveillance transponder and/or by ADS-B message, and by determining the predicted path of the aircraft and causing an alert to be issued in real time, the air traffic controller may be alerted more quickly and may correspondingly provide instructions more quickly and/or may have additional time to formulate instructions to be provided to the aircraft in order to ensure the safety of the aircraft.

By more accurately predicting the path of the aircraft based at least upon a representation of the roll angle of the aircraft and the cross-track component of the velocity of the aircraft, the computing system 30 of an example embodiment may be configured to provide alerts in a instance in which predicted path 54 of the aircraft is identified to intersect other types of NTZs. For example, simultaneous instrument approaches may be affected along curved flight paths. In this example, the NTZ 20 may correspondingly be curved and, as such, may include a portion 20*a* as shown in FIG. 7 that extends alongside the curved flight path so as to correspondingly define a curved aircraft approach corridor. By predicting the path of the aircraft based upon, for example, at least the representation of the roll angle of the aircraft and the cross-track component of the velocity of the aircraft, a computing system 30 and method of an example embodiment may identify instances in which the predicted path 54 of the aircraft will intersect the NTZ 20 including the curved portion 20*a* of the NTZ and may corresponding an issue alert in a reliable fashion without a significant number of nuisance alerts. As such, the computing system, method and computer program product of an example embodiment also support the development of more complex simultaneous instrument approaches including curved instrument approaches.

As described above, FIG. 3 illustrates a flowchart of a computing system 30, method, and computer program product according to example embodiments of the present disclosure. It will be understood that each block of the flowchart, and combinations of blocks in the flowchart, may be implemented by various means, such as hardware and/or a computer program product comprising one or more computer-readable storage mediums having computer readable program instructions stored thereon. For example, one or more of the procedures described herein may be embodied by computer program instructions of a computer program product. In this regard, the computer program product(s) which embody the procedures described herein may be stored by one or more memory devices 34 of a computing system 30 and executed by a processing circuitry 32 of the computing system. In some embodiments, the computer program instructions comprising the computer program product(s) which embody the procedures described above may be stored by a plurality of memory devices 34. As will be appreciated, any such computer program product may be loaded onto a computer or other programmable apparatus to produce a machine, such that the computer program product including the instructions which execute on the computer or other programmable apparatus creates means for implementing the functions specified in the flowchart blocks. Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart blocks. The computer program instructions of one or more computer program products may also be loaded onto the computing system or other programmable apparatus to cause a series of operations to be performed on the computing system or other programmable apparatus to produce a computer-implemented process such that the instructions which execute on the computing system or other programmable apparatus implement the functions specified in the flowchart blocks.

Accordingly, blocks or steps of the flowchart support combinations of means for performing the specified functions and combinations of steps for performing the specified functions. It will also be understood that one or more blocks of the flowchart, and combinations of blocks in the flowchart, may be implemented by special purpose hardware-based computer systems which perform the specified functions or steps, or combinations of special purpose hardware and computer program products.

The above described functions may be carried out in many ways. For example, any suitable means for carrying out each of the functions described above may be employed to carry out embodiments of the present disclosure. In one embodiment, a suitably configured computing system 30 may provide all or a portion of the elements of the present disclosure. In another embodiment, all or a portion of the elements may be configured by and operate under control of a computer program product. The computer program product for performing the methods of embodiments of the present disclosure includes a computer-readable storage medium, such as the non-volatile storage medium, and computer-readable program code portions, such as a series of computer instructions, embodied in the computer-readable storage medium.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A method for monitoring compliance with a non-transgression zone between aircraft approach corridors, the method comprising:

determining, with processing circuitry, a predicted path of an aircraft during a flight based upon at least a representation of a roll angle of the aircraft and a cross-track component of velocity of the aircraft;

identifying an instance in which the predicted path of the aircraft during the flight intersects the non-transgression zone; and with the processing circuitry, interacting with a user interface to cause an alert to be issued in the instance in which the predicted path of the aircraft during the flight intersects the non-transgression zone, wherein interacting with the user interface comprises interacting with a display to cause a visual alert to be issued in the instance in which the predicted path of the aircraft during the flight intersects the non-transgression zone or interacting with one or more speakers to cause an audible alert to be issued in the instance in which the predicted path of the aircraft during the flight intersects the non-transgression zone.

2. A method according to claim 1 wherein determining the predicted path of the aircraft comprises determining the representation of the roll angle of the aircraft in real time, and wherein causing the alert to be issued comprises causing the alert to be issued in real time.

3. A method according to claim 1 wherein determining the predicted path is further based upon a current position and heading of the aircraft.

4. A method according to claim 1 wherein determining the predicted path comprises determining a turn rate and a turn radius based upon at least the representation of the roll angle of the aircraft and the cross-track component of the velocity of the aircraft.

5. A method according to claim 1 further comprising receiving the representation of the roll angle of the aircraft and the cross-track component of the velocity of the aircraft from at least one of an Enhanced Surveillance (EHS) surveillance transponder or from an Automatic Dependent Surveillance Broadcast (ADS-B) message.

6. A method according to claim 1 wherein identifying an instance in which the predicted path of the aircraft intersects the non-transgression zone comprises determining, prior to the aircraft reaching a largest cross track position error, whether corrective action has been initiated by the aircraft to avoid intersection with the non-transgression zone.

7. A method according to claim 1 wherein the predicted path of the aircraft is determined by the processing circuitry which is embodied by an air traffic control ground station, by an air traffic control radar system or as an auxiliary function to a display of the air traffic control radar system.

8. A computing system for monitoring compliance with a non-transgression zone between aircraft approach corridors, the computing system comprising processing circuitry configured to:

determine a predicted path of an aircraft during a flight based upon at least a representation of a roll angle of the aircraft and a cross-track component of velocity of the aircraft;

identify an instance in which the predicted path of the aircraft during the flight intersects the non-transgression zone; and interact with a user interface to cause an alert to be issued in the instance in which the predicted path of the aircraft during the flight intersects the non-transgression zone, wherein the processing circuitry is configured to interact with the user interface by interacting with a display to cause a visual alert to be issued in the instance in which the predicted path of the aircraft during the flight intersects the non-transgression zone or by interacting with one or more speakers to cause an audible alert to be issued in the instance in which the predicted path of the aircraft during the flight intersects the non-transgression zone.

9. A computing system according to claim 8 wherein the processing circuitry is configured to determine the predicted path of the aircraft by determining the representation of the roll angle of the aircraft in real time, and wherein the processing circuitry is configured to cause the alert to be issued by causing the alert to be issued in real time.

10. A computing system according to claim 8 wherein the processing circuitry is configured to determine the predicted path based further upon a current position and heading of the aircraft.

11. A computing system according to claim 8 wherein the processing circuitry is configured to determine the predicted path by determining a turn rate and a turn radius based upon at least the representation of the roll angle of the aircraft and the cross-track component of the velocity of the aircraft.

12. A computing system according to claim 8 wherein the processing circuitry is further configured to receive the representation of the roll angle of the aircraft and the cross-track component of the velocity of the aircraft from at least one of an Enhanced Surveillance (EHS) surveillance transponder or from an Automatic Dependent Surveillance Broadcast (ADS-B) message.

13. A computing system according to claim 8 wherein the processing circuitry is configured to identify an instance in which the predicted path of the aircraft intersects the non-transgression zone by determining, prior to the aircraft reaching a largest cross track position error, whether corrective action has been initiated by the aircraft to avoid intersection with the non-transgression zone.

14. A computing system according to claim 8 wherein the processing circuitry is embodied by an air traffic control ground station, by an air traffic control radar system or as an auxiliary function to a display of the air traffic control radar system.

15. A computer program product for monitoring compliance with a non-transgression zone between aircraft approach corridors, the computer program product comprising at least one non-transitory computer-readable storage medium having computer-executable program code instructions stored therein, the computer-executable program code instructions comprising program code instructions configured to:

determine a predicted path of an aircraft during a flight based upon at least a representation of a roll angle of the aircraft and a cross-track component of velocity of the aircraft;

identify an instance in which the predicted path of the aircraft during the flight intersects the non-transgression zone; and interact with a user interface to cause an alert to be issued in the instance in which the predicted path of the aircraft during the flight intersects the non-transgression zone by interacting with a display to cause a visual alert to be issued in the instance in which the predicted path of the aircraft during the flight intersects the non-transgression zone or by interacting with one or more speakers to cause an audible alert to be issued in the instance in which the predicted path of the aircraft during the flight intersects the non-transgression zone.

16. A computer program product according to claim 15 wherein the program code instructions configured to determine the predicted path of the aircraft comprise program code instructions configured to determine the representation of the roll angle of the aircraft in real time, and wherein the program code instructions configured to cause the alert to be issued comprise program code instructions configured to cause the alert to be issued in real time.

17. A computer program product according to claim 15 wherein the program code instructions configured to determine the predicted path are further based upon a current position and heading of the aircraft.

18. A computer program product according to claim 15 wherein the program code instructions configured to determine the predicted path comprise program code instructions configured to determine a turn rate and a turn radius based upon at least the representation of the roll angle of the aircraft and the cross-track component of the velocity of the aircraft.

19. A computer program product according to claim 15 wherein the computer-executable program code instructions further comprise program code instructions configured to receive the representation of the roll angle of the aircraft and the cross-track component of the velocity of the aircraft from at least one of an Enhanced Surveillance (EHS) surveillance transponder or from an Automatic Dependent Surveillance Broadcast (ADS-B) message.

20. A computer program product according to claim 15 wherein the program code instructions configured to identify an instance in which the predicted path of the aircraft intersects the non-transgression zone comprise program code instructions configured to determine, prior to the aircraft reaching a largest cross track position error, whether corrective action has been initiated by the aircraft to avoid intersection with the non-transgression zone.

* * * * *